US011159314B2

(12) United States Patent
Kato et al.

(10) Patent No.: US 11,159,314 B2
(45) Date of Patent: Oct. 26, 2021

(54) IC CARD SYSTEM AND INFORMATION REGISTERING METHOD

(71) Applicants: Kabushiki Kaisha Toshiba, Minato-ku (JP); Toshiba Infrastructure Systems & Solutions Corporation, Kawasaki (JP)

(72) Inventors: Masakazu Kato, Shibuya (JP); Mitsuaki Satsukawa, Yokohama (JP)

(73) Assignees: Kabushiki Kaisha Toshiba, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 220 days.

(21) Appl. No.: 16/439,443

(22) Filed: Jun. 12, 2019

(65) Prior Publication Data

US 2019/0386826 A1 Dec. 19, 2019

(30) Foreign Application Priority Data

Jun. 18, 2018 (JP) .............................. JP2018-115081

(51) Int. Cl.
*H04W 12/00* (2021.01)
*H04L 9/08* (2006.01)
*G06K 19/07* (2006.01)

(52) U.S. Cl.
CPC ............ *H04L 9/0866* (2013.01); *G06K 19/07* (2013.01); *H04L 9/088* (2013.01)

(58) Field of Classification Search
CPC ... H04L 9/0866; H04L 9/088; H04L 63/0853; H04L 63/0861; G06K 19/07; G06F 21/34; G06F 21/32; H04W 12/06
See application file for complete search history.

(56) References Cited

U.S. PATENT DOCUMENTS

2007/0094512 A1* 4/2007 Nomiya .............. H04L 63/0861
713/186
2014/0025520 A1* 1/2014 Mardikar ........... G06Q 20/3821
705/21
(Continued)

FOREIGN PATENT DOCUMENTS

JP 2009-169809 7/2009
JP 2013-543336 11/2013
(Continued)

OTHER PUBLICATIONS

Extended European Search Report dated Oct. 10, 2019 in corresponding European Patent Application No. 19180049.9, 6 pages.
(Continued)

*Primary Examiner* — Alexander Lagor
(74) *Attorney, Agent, or Firm* — Oblon, McClelland, Maier & Neustadt, L.L.P.

(57) ABSTRACT

An IC card system includes an IC card management server and an IC card. The IC card management server requests a SIM management server to make an inquiry regarding a user based on card identification information and user information relating to a contract of SIM card, and, in a case that validity of the user is verified, transmits a generation request for generating a registration application registering biometric authentication information, including the card identification information and the secret key, to the SIM management server. The IC card includes a data storage storing the card identification information and the secret key and storing the biometric authentication information and, in a case that authentication based on the card identification information and the secret key through communication with the SIM card based on the registration application is succeed, stores the biometric authentication information based on the biometric information in the data storage.

7 Claims, 7 Drawing Sheets

(56) References Cited

U.S. PATENT DOCUMENTS

2017/0374066 A1* 12/2017 Fukuda ............... H04L 63/0853
2018/0165676 A1   6/2018 Bhatt et al.

FOREIGN PATENT DOCUMENTS

| JP | 2015-228570 | 12/2015 |
| JP | 2016-92507 | 5/2016 |
| WO | WO 2013/039625 A1 | 3/2013 |

OTHER PUBLICATIONS

Search Report and Written Opinion dated May 16, 2020 in corresponding Singaporean Patent Application No. 10201905404W, 8 pages.

* cited by examiner

| CARD ID | USER INFORMATION | | ... | SECRET KEY | REGISTRATION/ NON-REGISTRATION OF BIOMETRIC AUTHENTICATION INFORMATION | ... |
| --- | --- | --- | --- | --- | --- | --- |
| | USER NAME | TELEPHONE NUMBER | | | | |
| AAAAAA | ○○ AABB | 090XXX... | ... | KEY1 | NOT-REGISTERED | ... |
| BBBBBB | ○× ABDD | 090YXY... | ... | KEY2 | REGISTERED | ... |
| ... | ... | ... | ... | ... | ... | ... |

| USER NAME | IMSI | MSISDN | ... |
| --- | --- | --- | --- |
| ○○ AABB | XXXX | XXX090XXX... | ... |
| ○× ABDD | YYYY | XXX090YXY... | ... |
| ... | ... | ... | ... |

IC CARD SYSTEM AND INFORMATION REGISTERING METHOD

BACKGROUND

Technical Field

Embodiments of the present invention relate to an IC card system and an information registering method.

Related Art

In recent years, technologies for using biometric information such as fingerprints for personal authentication of integrated circuit (IC) cards have been put into practical use as disclosed in Japanese Unexamined Patent Application, First Publication No. 2015-228570 and Japanese Unexamined Patent Application, First Publication No. 2009-169809. In such IC card systems, in order to perform personal authentication, it is necessary to register authentication data (biometric authentication information) based on biometric information of a user in the IC card. The IC card systems in related art are not convenient because it is necessary to visit certain facilities such as counters of banks so as to register authentication data.

DETAILED DESCRIPTIONS

Hereinafter, IC card systems and information registering methods according to embodiments will be described with reference to the drawings.

First Embodiment

Figure 1:
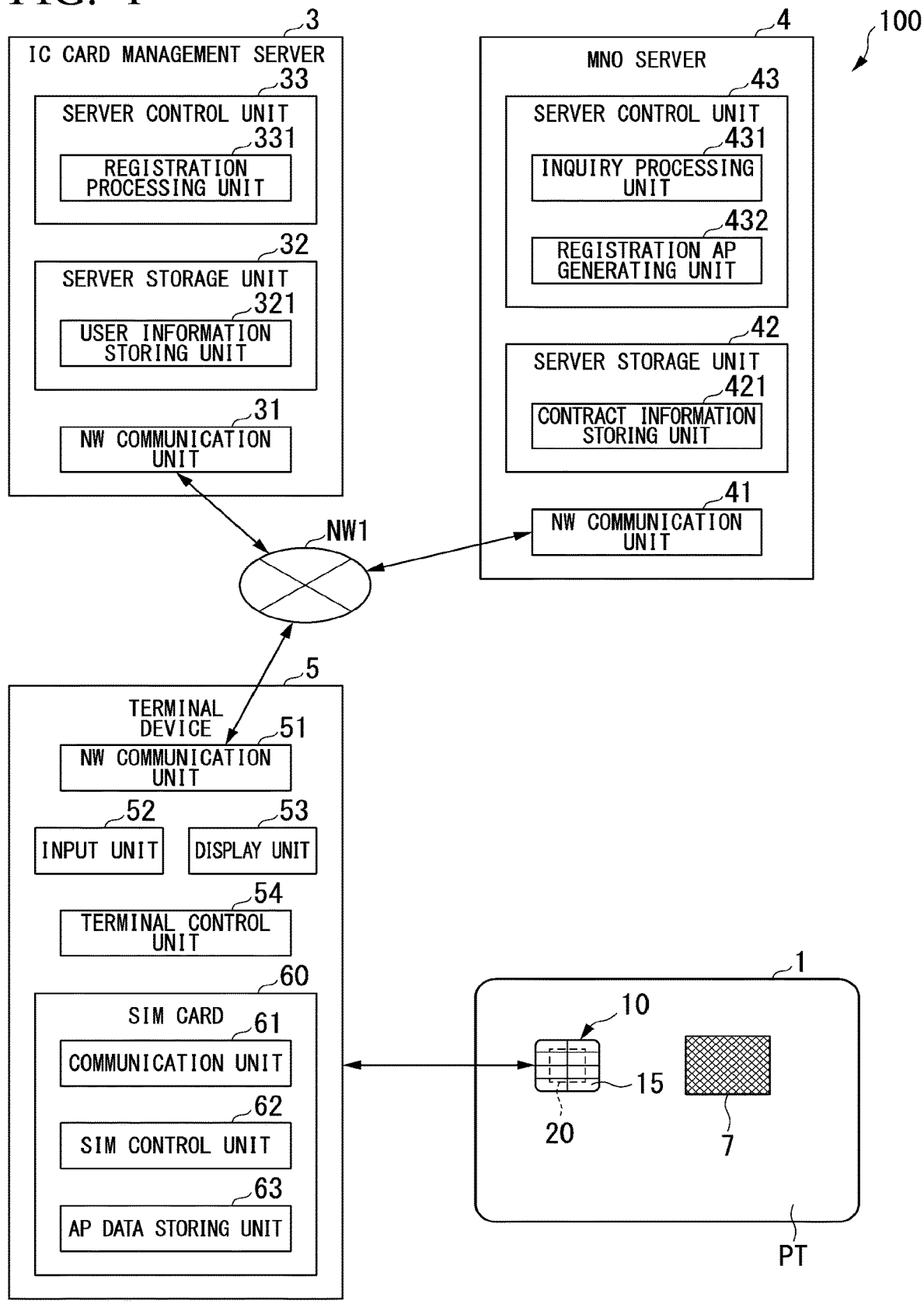
FIG. 1 is a block diagram illustrating one example of an IC card system according to a first embodiment.

FIG. 1 is a block diagram illustrating one example of an IC card system 100 according to a first embodiment. As illustrated in FIG. 1, the IC card system 100 includes an IC card 1, an IC card management server 3, a mobile network operator (MNO) server 4, and a terminal device 5. The IC card management server 3, the MNO server 4, and the terminal device 5 are connectable through a network NW1.

The IC card management server 3 is a server apparatus that manages the IC card 1. For example, when biometric authentication information based on fingerprint information is to be registered in the IC card 1, the IC card management server 3 requests the MNO server 4 to make an inquiry regarding a user of the IC card 1 based on user information. In addition, in a case in which the validity of a user using the IC card 1 is verified, the IC card management server 3 transmits a generation request that includes a card ID (card identification information) and a secret key for generating a registration application registering biometric authentication information to the MNO server 4.

In addition, the IC card management server 3 includes a network (NW) communicator 31, a server storage unit 32, and a server controller 33.

The NW communicator 31 is connected to the network NW1 using a wireless local area network (LAN) communication or the like and performs various kinds of communication through the network NW1. The NW communicator 31, for example, is connected to the MNO server 4 or the terminal device 5 through the network NW1 and performs various kinds of communication when biometric authentication information is registered in the IC card 1.

The server storage unit 32 stores various kinds of information used by the IC card management server 3. The server storage unit 32, for example, includes a user information storage 321.

The user information storage 321 stores a card ID and a secret key (common key) used when user information and biometric authentication information relating to a user using the IC card 1 are registered in the IC card 1. Here, an example of data stored by the user information storage 321 will be described with reference to FIG. 2.

Figures 2, 3, 4:
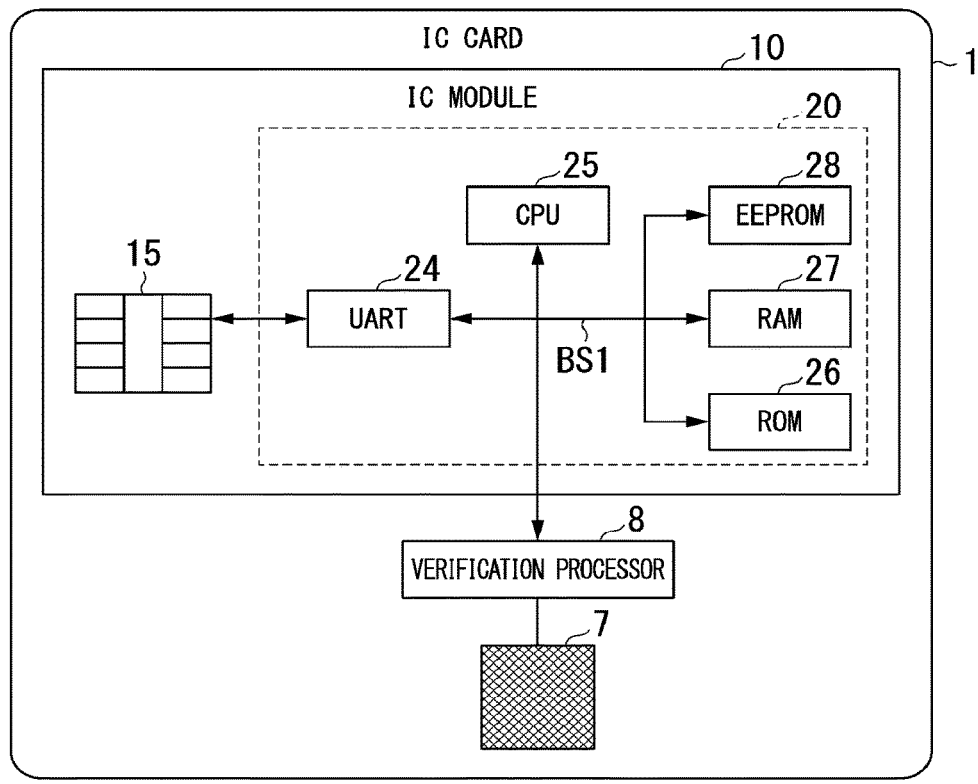
FIG. 2 is a diagram illustrating an example of data of a user information storage according to the first embodiment.
FIG. 3 is a diagram illustrating an example of data of a contract information storage according to the first embodiment.
FIG. 4 is a diagram illustrating an example of the configuration of the hardware of an IC card according to the first embodiment.

FIG. 2 is a diagram illustrating an example of data of the user information storage 321 according to this embodiment.

As illustrated in FIG. 2, the user information storage 321 stores a "card ID," "user information," a "secret key," and "registration/non-registration of biometric authentication information" in association with each other. Here, the "card ID" is card identification information used for identifying the IC card 1 and, for example, is an individual ID.

The "user information," for example, is information relating to a contract of a subscriber identity module (SIM) card 60 for mobile communication with a mobile phone or the like for which a user has a contract. In the "user information," for example, a "user name," a "telephone number," and the like are included. The "user name" is a name of a party of a contract of the SIM card 60, and the "telephone number" is a contract telephone number of the SIM card 60 (for example, a mobile phone number).

The "secret key" represents a secret key used when biometric authentication information is registered in the IC card 1, and the "registration/non-registration of biometric authentication information" represents whether or not biometric authentication information has been registered in the IC card 1.

The example illustrated in FIG. 2 represents that, as "user information" of an IC card 1 of which a "card ID" is "AAAAAA," the "user name" is "AABB," and the "telephone number" is "090XXX • • •." In addition, it is represented that a "secret key" of the IC card 1 is "KEY1," and "registration/non-registration of biometric authentication information" is "not registered."

In addition, it is represented that, as "user information" of the IC card 1 of which a "card ID" is "BBBBBB," the "user name" is "ABDD," and the "telephone number" is "090YXY • • •." In addition, it is represented that a "secret key" of this IC card 1 is "KEY2," and "registration/non-registration of biometric authentication information" is "registered."

Referring back to FIG. 1, the server controller 33, for example, is a processor including a central processor (CPU) and the like and integrally controls the IC card management server 3. The server controller 33, for example, executes various processes such as a process of registering biometric authentication information in the IC card 1 and the like. The server controller 33 includes a registration processor 331.

The registration processor 331 executes a process of registering biometric authentication information in the IC card 1. For example, in response to a request for registering biometric authentication information from the terminal device 5 to be described later, the registration processor 331 may request the MNO server 4 to make an inquiry regarding a user based on user information.

For example, the registration processor 331 receives a registration request including information that can be used for identifying a user (for example, a user name, a telephone number, a card ID of the IC card 1, or the like) through the NW communicator 31. In response to this registration request, the registration processor 331 searches for user information corresponding to the information that can be used for identifying a user from the user information storage 321 and acquires the user information from the user information storage 321. The registration processor 331 transmits an inquiry request including the acquired user information (for example, a user name and a telephone number) to the MNO server 4 through the NW communicator 31. In other words, the registration processor 331 requests to make an inquiry regarding a user using the IC card 1 based on the contract information of the SIM card 60.

In addition, the registration processor 331 receives a result of the inquiry regarding a user acquired by the MNO server 4 through the NW communicator 31. For example, in a case in which the validity of the user is verified in accordance with the result of the inquiry regarding a user, the registration processor 331 may transmit a generation request for generating a registration application (a generation request) to the MNO server 4. Here, the generation request is a request for generating a registration application that is a dedicated application for registering biometric authentication information in the IC card 1. In this generation request, as information used for generating a dedicated registration application for the IC card 1 for which the validity of a user has been verified, for example, a card ID, a secret key, and the like may be included.

For example, in a case in which the validity of the user has been verified, the registration processor 331, for example, acquires a card ID and a secret key corresponding to the IC card 1 for which the validity of the user has been verified from the user information storage 321. The registration processor 331 transmits a generation request including the card ID and the secret key that have been acquired to the MNO server 4 through the NW communicator 31. In addition, in the generation request, information representing a telephone number may be included for identifying the SIM card 60.

In addition, the registration processor 331 receives a notification of completion of generation of a registration application from the MNO server 4 through the NW communicator 31. For example, in a case in which a notification of completion of registration of biometric authentication information has been received from the terminal device 5 (the SIM card 60) through the NW communicator 31 after reception of the notification of completion of generation of the registration application, the registration processor 331 ends the process of registering biometric authentication information. In addition, in a case in which a notification of completion of registration of biometric authentication information has been received after reception of the notification of completion of generation of a registration application, the registration processor 331 changes the "registration/non-registration of biometric authentication information" corresponding to the IC card 1 stored by the user information storage 321 to "registered." On the other hand, in a case in which the validity of the user has not been verified in accordance with the result of the inquiry regarding the user, the registration processor 331 stops the process of registering biometric authentication information.

The MNO server 4 (one example of a SIM management server) is a server apparatus managed by a mobile communication service provider and, for example, manages the SIM card 60. For example, the MNO server 4 may execute a process of making an inquiry regarding a user (a party of a contract of the SIM card 6) in accordance with the inquiry request described above and execute a process of generating a registration application in accordance with the generation request described above. In addition, in a case in which the process of generating a registration application is completed, the MNO server 4 notifies the terminal device 5 of a download notification of the registration application.

The MNO server 4 includes a NW communicator 41, a server storage unit 42, and a server controller 43.

The NW communicator 41 is connected to the network NW1 using wired local area network (LAN) communication or the like and performs various types of communication through the network NW1. The NW communicator 41, for example, performs various types of communication when it is connected to the IC card management server 3 or the terminal device 5 through the network NW1 and registers biometric authentication information in the IC card 1.

The server storage unit 42 stores various kinds of information used by the MNO server 4. The server storage unit 42, for example, includes a contract information storage 421.

The contract information storage 421 stores information relating to a contract of the SIM card 60. Here, in the information relating to a contract, for example, contract information registered when a contract is made for the SIM card 60 is included. Here, an example of data stored by the contract information storage 421 will be described with reference to FIG. 3.

FIG. 3 is a diagram illustrating an example of data of the contract information storage 421 according to this embodiment.

As illustrated in FIG. 3, the contract information storage 421 stores a "user name," an "IMSI," and an "MSISDN" in association with each other. Here, the "user name" is a name of a party of a contract of the SIM card 60, the "IMSI" is an international mobile subscriber identity (IMSI) of the SIM card 60 and is card identification information used for identifying the SIM card 60. In addition, the "MSISDN" is a mobile subscriber integrated services digital network number (MSISDN) corresponding to the SIM card 60 and is information representing a telephone number corresponding to the SIM card 60. The "IMSI" and the "MSISDN" are stored also in the SIM card 60 to be described later.

In the example illustrated in FIG. 3, for example, it is represented that an "IMSI" corresponding to the user name "AABB" is "XXXX," and an "MSISDN" is "XXX090XXX ". . ." In addition, it is represented that an "WISP" corresponding to the user name "ABDD" is "YYYY," and an "MSISDN" is "XXX090YXY . . . ."

Referring back to the description of FIG. 1, the server controller 43, for example, is a processor including a CPU and the like and integrally controls the MNO server 4. For example, when biometric authentication information is registered in the IC card 1, the server controller 43 executes a process of making an inquiry regarding a user based on the contract information of the SIM card 60 in response to the inquiry request described above. In addition, the server controller 43 executes a process of generating a registration application in response to the generation request described above.

The server controller 43 includes an inquiry processor 431 and a registration application (AP) generator 432.

In a case in which a request for making an inquiry regarding a user is received from the IC card management server 3 through the NW communicator 41, the inquiry processor 431 executes a user inquiry process. The inquiry processor 431, for example, compares a user name and a telephone number, which are user information included in the inquiry request, with the contract information stored by the contract information storage 421 and determines the validity of the user as the user inquiry process. The inquiry processor 431 transmits a result of the user inquiry to the IC card management server 3 through the NW communicator 41.

In a case in which a request for generating a registration application has been received from the IC card management server 3 through the NW communicator 41, the registration AP generator 432 generates a registration application using a card ID and a secret key included in the generation request. Here, the registration application is a dedicated application for registering biometric authentication information in an IC card 1 corresponding to a card ID and a secret key and is downloaded (installed) to the SIM card 60 through the terminal device 5. In a case in which the generation of the registration application has been completed, the registration AP generator 432 transmits a notification of completion of generation of the registration application to the IC card management server 3 through the NW communicator 41.

In addition, in a case in which the generation of the registration application has been completed, the registration AP generator 432 notifies the terminal device 5 of a download notification representing that the generated registration application can be downloaded through the NW communicator 41. The registration AP generator 432, for example, transmits a message of a download notification to the terminal device 5, into which a target SIM card 60 is integrated, using a short message service (SMS).

In addition, in a case in which a download request for a registration application has been received from the terminal device 5 through the NW communicator 41, the registration AP generator 432 executes a download process of downloading the registration application to the terminal device 5 and installing the downloaded registration application in the SIM card 60. In the registration application installed in the SIM card 60, a card ID and a secret key of the target IC card 1 are included.

The terminal device 5, for example, is a mobile communication terminal such as a mobile phone or a smartphone and has the SIM card 60 integrated therein. When biometric authentication information is registered in the IC card 1, the terminal device 5 transmits a request for registering the biometric authentication information to the IC card management server 3 in accordance with a user's operation. For example, in a case in which a notification of download of a registration application has been received using a SMS, the terminal device 5 downloads the registration application from the MNO server 4 to the SIM card 6 in accordance with a user's operation.

In addition, the terminal device 5 relays communication between the SIM card 6 and the IC card 1 on the basis of the registration application that has been downloaded (installed) to the SIM card 6 and registers the biometric authentication information in the IC card 1.

The terminal device 5 includes a NW communicator 51, an input device 52, a display device 53, a terminal controller 54, and a SIM card 60.

The NW communicator 51 is connected to the network NW1 using mobile communication, wireless LAN communication, or the like and performs various types of communication through the network NW1 The NW communicator 41, for example, is connected to the IC card management server 3 or the MNO server 4 through the network NW1 and performs various types of communication when biometric authentication information is registered in the IC card 1.

The input device 52, for example, is an input device such as a keyboard, a touch panel, or the like and accepts input information of various operations performed by a user. The input device 52 outputs the accepted input information of an operation to the terminal controller 54.

The display device 53, for example, is a display device such as a liquid crystal display device and displays various kinds of information. The display device 53, for example, displays various kinds of information such as various operation screens and an input screen for information, messages notified to the terminal device 5, and the like.

The terminal controller 54, for example, is a processor including a CPU or the like and integrally controls the terminal device 5. The terminal controller 54 transmits a request for registering biometric authentication information to the IC card management server 3 through the NW communicator 51 in accordance with a user's operation using the input device 52. In addition, in a case in which a notification of download of a registration application has been received from the MNO server 4 through the NW communicator 51 using a SMS, the terminal controller 54 displays details of the download notification on the display device 53.

Furthermore, the terminal controller 54 acquires a registration application from the MNO server 4 through the NW communicator 51 on the basis of the download notification in accordance with a user's operation using the input device 52. The terminal controller 54 stores the acquired registration application in the SIM card 60. In addition, in a case in which a notification of completion of registration has been received from the IC card 1, the terminal controller 54 transmits a registration completion notification to the IC card management server 3 through the NW communicator 51.

Communication between the terminal device 5 or the SIM card 60 and the IC card 1 is performed using a reader/writer device not illustrated in the drawing or short-distance wireless communication such as near field communication (NFC).

The SIM card 60 is a card, which stores contract information with a user, integrated into the terminal device 5. The basic configuration of the SIM card 60 is similar to an IC card 1a, which will be described later, not including the fingerprint sensor 7.

The SIM card 60 includes a communicator 61, a SIM controller 62, and an AP data storage 63.

The communicator 61 communicates with the terminal device 5 or the IC card 1 through the terminal device 5.

The SIM controller 62, for example, includes a CPU and integrally controls the SIM card 60. The SIM controller 62 executes a process according to a command received through the communicator 61 (a command process). Then, the SIM controller 62 transmits a response (a process response) that is a result of execution of the command process through the communicator 61.

The AP data storage 63 (one example of a data storage) stores the IMSI and the MSISDN that are the contract information described above. In addition, in the AP data storage 63, a registration application including a card ID and a secret key of a target IC card 1 in which biometric authentication information is to be registered is stored.

The IC card 1, for example, is formed by mounting an IC module 10 in a plastic card base PT (one example of a card main body). In other words, the IC card 1 includes an IC module 10, a fingerprint sensor 7, and a card base PT in which the IC module 10 and the fingerprint sensor 7 are embedded. The IC card 1 can communicate with the terminal device 5 (the SIM card 60) through a contact part 15.

For example, the IC card 1 receives a command (a process request) transmitted from the outside through the contact part 15 and executes a process (a command process) according to the received command. Then, the IC card 1 transmits a response (a process response) that is a result of execution of the command process to the outside through the contact part 15.

The IC module 10 is a module that includes the contact part 15 and an IC chip 20 and, for example, is traded in the form of a chip on tape (COT) in which a plurality of IC modules 10 are disposed on a tape or the like. There are cases in which a single IC module 10 individually extracted and separated from the tape is called a COT.

The contact part 15 has terminals of various signals required for the IC card 1 to operate. Here, the terminals of various signals include terminals supplied with a power source voltage, a clock signal, a reset signal, and the like from the outside such as the terminal device 5 and a serial data input/output terminal (an SIO terminal) used for communicating with the outside.

The IC chip 20, for example, is a large scale integration (LSI) such as a one-chip microprocessor.

The fingerprint sensor 7 (one example of a biometric information acquiring unit) acquires fingerprint information of a user. In this embodiment, the fingerprint information is used as one example of biometric information. The fingerprint sensor 7, for example, acquires fingerprint information of a user using one of a capacitance type, a heat sensitive type, an optical type, and the like.

FIG. 4 is a hardware configuration diagram of the IC card 1 according to this embodiment.

As illustrated in FIG. 4, the IC card 1 includes an IC module 10 including the contact part 15 and the IC chip 20, a fingerprint sensor 7, and a verification processor 8. The IC chip 20 includes a universal asynchronous receiver transmitter (UART) 24, a CPU 25, a read only memory (ROM) 26, a random access memory (RAM) 27, an electrically erasable programmable ROM (EEPROM) 28. Such constituent elements are interconnected through an internal bus BS1.

The UART 24 performs serial data communication with the terminal device 5 through the SIO terminal described above. The UART 24 outputs data acquired by converting a serial data signal received through the SIO terminal into parallel data (for example, data of one byte) to an internal bus BS1. In addition, the UART 24 converts data acquired through the internal bus BS1 into serial data and outputs the converted serial data to the terminal device 5 through the SIO terminal. The UART 24, for example, receives a command from the terminal device 5 through the SIO terminal. In addition, the UART 24 transmits a response to the terminal device 5 through the SIO terminal.

The CPU 25 performs various processes of the IC card 1 by executing a program stored in the ROM 26 or the EEPROM 28. The CPU 25, for example, executes a command process according to the command received by the UART 24 through the contact part 15.

The ROM 26, for example, is a nonvolatile memory such as a mask ROM and stores programs used for executing various processes of the IC card 1 and data such as a command table. The RAM 27, for example, is volatile memory such as a static RAM (SRAM) and temporarily stores data used when various processes of the IC card 1 are performed.

The EEPROM 28, for example, is an electrically-rewritable nonvolatile memory. The EEPROM 28 stores various kinds of data used by the IC card 1. The EEPROM 28, for example, stores information used for various services (applications) using the IC card 1.

The verification processor 8, for example, includes a CPU and a program memory. The verification processor 8 is connected to the fingerprint sensor 7 through a dedicated line or the like and can detect whether or not the fingerprint sensor 7 is in a state being able to acquire fingerprint information (conduction state). The verification processor 8 performs authentication of a user by converting fingerprint information into biometric authentication information acquired by extracting a feature quantity of the fingerprint information of the user acquired using the fingerprint sensor 7 and comparing the converted biometric authentication information with biometric authentication information stored in the IC module 10 and outputs a result of the authentication to the IC module 10.

In addition, when biometric authentication information is registered in the IC card 1, the verification processor 8 generates biometric authentication information based on the fingerprint information of the user acquired by the fingerprint sensor 7 and outputs the generated biometric authentication information to the IC module 10. In other words, when biometric authentication information is registered in the IC card 1, the verification processor 8 converts fingerprint information into biometric authentication information acquired by extracting a feature quantity of the fingerprint information of the user acquired by the fingerprint sensor 7 and outputs the converted biometric authentication information to the IC module 10.

Next, an example of the functional configuration of the IC card 1 according to this embodiment will be described with reference to FIG. 5.

Figure 5:
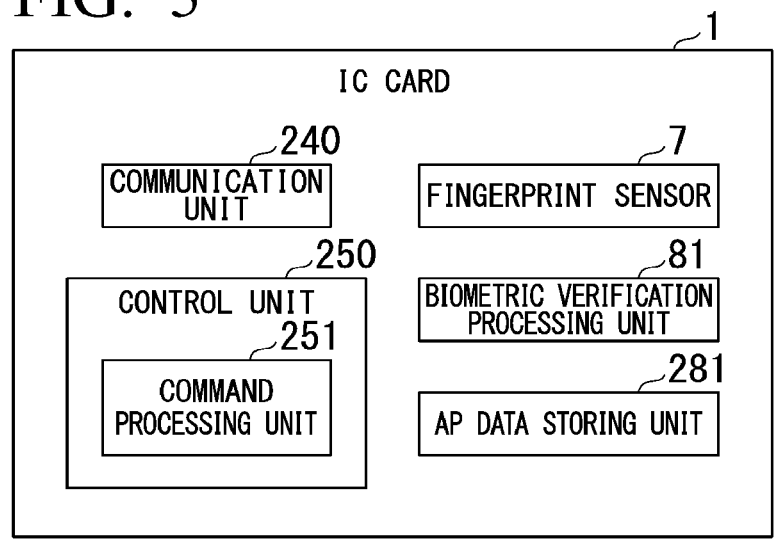
FIG. 5 is a block diagram illustrating an example of the functional configuration of an IC card according to the first embodiment.

FIG. 5 is a block diagram illustrating an example of the functional configuration of the IC card 1 according to this embodiment.

As illustrated in FIG. 5, the IC card 1 includes a communicator 240, a controller 250, a fingerprint sensor 7, a biometric verification processor 81, and an AP data storage 281.

Here, each unit of the IC card 1 illustrated in FIG. 5 is realized using hardware of the IC card 1 illustrated in FIG. 4.

The communicator 240, for example, is realized by the UART 24, the CPU 25, and a program stored in the ROM 26 and, for example, transmits/receives a command and a response to/from the terminal device 5 through the contact part 15. In other words, the communicator 240 receives a command requesting a predetermined process (a process request) from the terminal device 5 and transmits a response to a command (a process response) to the terminal device 5.

The AP data storage 281 (one example of a data storage), for example, is a storage unit configured by the EEPROM 28 and stores application data. The AP data storage 281, for example, stores a card ID, a secret key, biometric authentication information, and the like as the application data.

The controller 250, for example, is realized by the CPU 25 and the RAM 27 and the ROM 26 or the EEPROM 28 and can integrally controls the IC card 1. The controller 250 includes a command processor 251.

The command processor 251 (one example of a processor) executes processes of various commands (command processes) in accordance with commands (process requests) transmitted from the terminal device 5 (the SIM card 60) to the IC card 1. The command processor 251, for example, executes a command process in accordance with a command received from the terminal device 5 (the SIM card 60) through the communicator 240. In addition, the command processor 251 transmits a response that is a result of the command process to the terminal device 5 (the SIM card 60) through the communicator 240.

In addition, for example, in a case in which a card ID and a secret key input from the SIM card 60 respectively match a card ID and a secret key stored by the AP data storage 281, the command processor 251 permits registration of the biometric authentication information. In a case in which the registration of the biometric authentication information is permitted, the command processor 251 causes the biometric verification processor 81 to be described later to generate biometric authentication information based on the fingerprint information of the user acquired from the fingerprint sensor 7. The command processor 251 stores the biometric authentication information acquired from the biometric verification processor 81 in the AP data storage 281.

In addition, in a case in which authentication using biometric information of a user is performed, the command processor 251 outputs the biometric authentication information stored by the AP data storage 281 to the biometric verification processor 81 and acquires a result of the verification with the biometric authentication information based on the fingerprint information of the user acquired from the fingerprint sensor 7 from the biometric verification processor 81. The command processor 251 outputs a response including the acquired result of the verification through the communicator 240.

The biometric verification processor 81 is realized by the verification processor 8. In a case in which biometric authentication information is registered, the biometric verification processor 81 generates biometric authentication information on the basis of the fingerprint information of the user acquired from the fingerprint sensor 7 and outputs the generated biometric authentication information to the command processor 251.

In addition, in a case in which authentication using biometric information of a user is performed, the biometric verification processor 81 acquires biometric authentication information, which is stored by the AP data storage 281, output from the command processor 251 (the biometric authentication information that has been registered). In addition, the biometric verification processor 81 generates biometric authentication information on the basis of the fingerprint information of the user acquired from the fingerprint sensor 7 and verifies the generated biometric authentication information with the biometric authentication information acquired from the command processor 251 (the registered biometric authentication information). The biometric verification processor 81 outputs a result of the verification to the command processor 251.

Next, the operation of the IC card system 100 according to this embodiment will be described with reference to the drawing.

Figure 6:
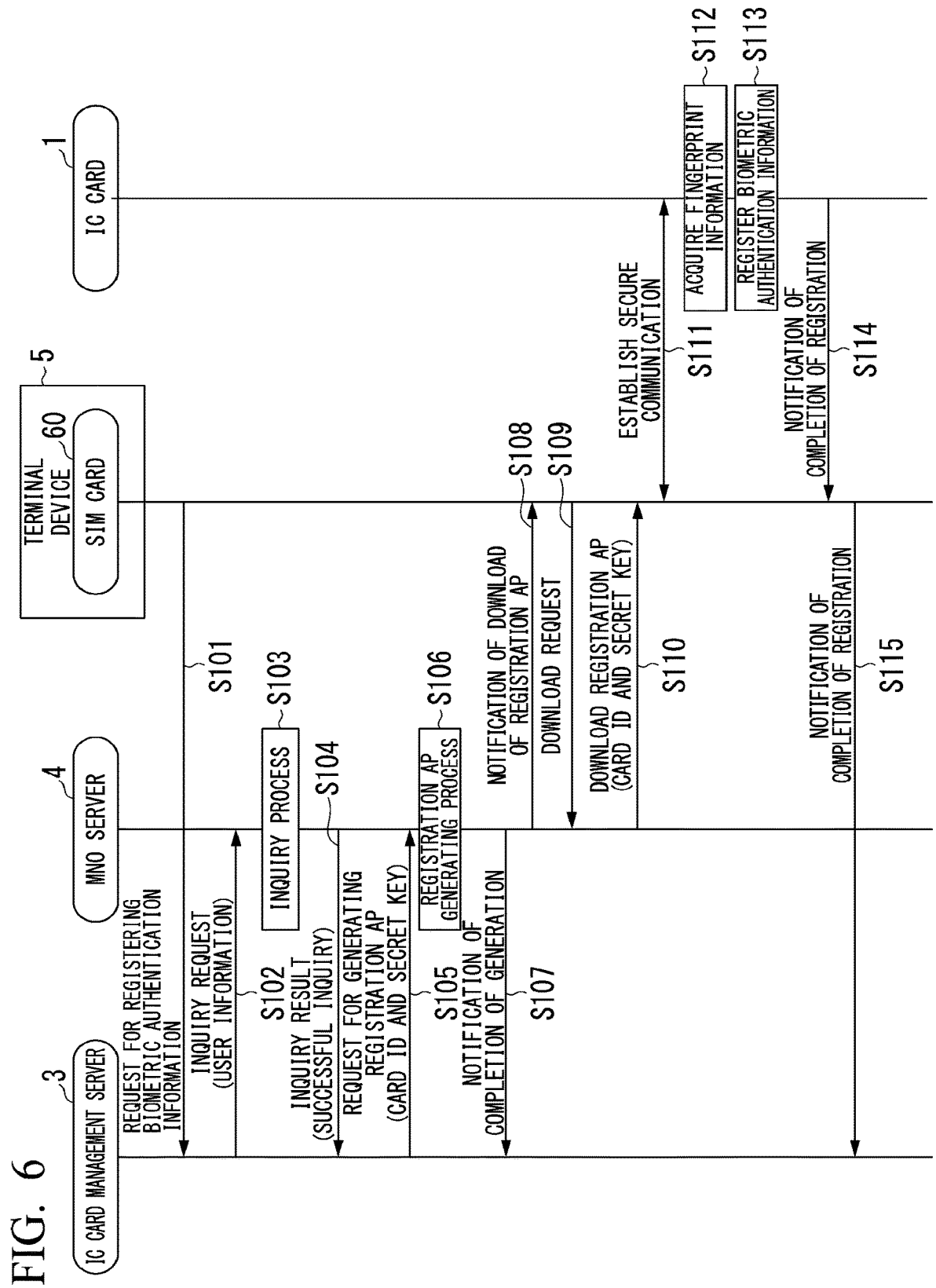
FIG. 6 is a diagram illustrating one example of an operation of an IC card system according to the first embodiment.

FIG. 6 is a diagram illustrating one example of operations of the IC card system 100 according to this embodiment. FIG. 6 illustrates a process of registering biometric authentication information of the IC card system 100.

As illustrated in FIG. 6, when biometric authentication information is registered in the IC card 1, the terminal device 5, first, transmits a request for registering the biometric authentication information to the IC card management server 3 (Step S101). In other words, the terminal controller 54 of the terminal device 5 transmits a request for registering biometric authentication information to the IC card management server 3 through the NW communicator 51 in accordance with a user's operation using the input device 52. In the request for registering biometric authentication information, for example, a user name, a telephone number, a card ID of the IC card 1, and the like are assumed to be included as information that can be used for identifying a user.

Next, the IC card management server 3 transmits an inquiry request including user information to the MNO server 4 in response to the request for registering biometric authentication information (Step S102). In a case in which a registration request including information that can be used for identifying a user has been received through the NW communicator 31, the registration processor 331 of the IC card management server 3 searches user information corresponding to the information that can be used for identifying a user from the user information storage 321 and acquires the user information from the user information storage 321. The registration processor 331 transmits an inquiry request including the acquired user information (for example, a user name and a telephone number) to the MNO server 4 through the NW communicator 31. In this way, the registration processor 331 requests to make an inquiry regarding a user using the IC card 1 based on the contract information of the SIM card 60.

Next, the MNO server 4 executes an inquiry process in response to the inquiry request (Step S103). In a case in which a request for making an inquiry regarding a user has been received from the IC card management server 3 through the NW communicator 41, the inquiry processor 431 of the MNO server 4 executes a process of making an inquiry regarding the user. The inquiry processor 431 compares user information included in the inquiry request, for example, a user name and a telephone number with the contract information stored by the contract information storage 421 and determines validity of a user as the process of making an inquiry regarding the user.

Next, the MNO server 4 transmits a result of the inquiry to the IC card management server 3 (Step S104). The inquiry processor 431 transmits the result of the inquiry regarding the user to the IC card management server 3 through the NW communicator 41. In the example illustrated in this drawing, the inquiry regarding a user will be described as being successful.

Next, the IC card management server 3 transmits a request for generating a registration application to the MNO server 4 (Step S105). The registration processor 331 receives a result of the inquiry regarding the user acquired by the MNO server 4 through the NW communicator 31 and, in a case in which the validity of the user is verified, acquires, for example, a card ID and a secret key corresponding to the IC card 1 of which the validity of the user has been verified from the user information storage 321. The registration processor 331 transmits a generation request including the card ID and the secret key that have been acquired to the MNO server 4 through the NW communicator 31. In the generation request, information representing a telephone number is assumed to be included for identifying the SIM card 60.

Next, the MNO server 4 executes a process of generating a registration application (Step S106) In a case in which a request for generating a registration application has been received from the IC card management server 3 through the NW communicator 41, the registration AP generator 432 of the MNO server 4 generates a registration application using the card ID and the secret key included in the generation request.

Next, the MNO server 4 notifies the IC card management server 3 of completion of the generation of the registration application (Step S107).

In addition, the MNO server 4 notifies the terminal device 5 of a notification of download of the registration application (Step S108). The registration AP generator 432 notifies the terminal device 5 of the notification of download representing that the generated registration application can be downloaded, for example, using the SMS.

Next, the terminal device 5 transmits a request for downloading the registration application to the MNO server 4 (Step S109). The terminal controller 54 of the terminal device 5 causes the display device 53 to display the notification of the download described above. In accordance with an operation of the input device 52 executed by a user who has checked the notification of the download displayed on the display device 53, the terminal controller 54 transmits a download request to the MNO server 4 through the NW communicator 51.

Next, in response to the download request, the MNO server 4 executes download of the registration application to the SIM card 60 (Step S110). In a case in which a download request for a registration application has been received from the terminal device 5 through the NW communicator 41, the registration AP generator 432 executes a download process of downloading the registration application to the SIM card 60 of the terminal device 5. The terminal device 5 acquires a registration application from the MNO server 4 and stores application data including a card ID and a secret key corresponding to the target IC card 1 for registering biometric authentication information in the AP data storage 63 through the communicator 61 of the SIM card 60.

Next, the SIM card 60 of the terminal device 5 establishes secure communication with the IC card 1 (Step S111). The SIM card 60 starts communication with the IC card 1 through the terminal device 5 on the basis of the registration application and executes an authentication process with the IC card 1 using the card ID and the secret key stored in the AP data storage 63. In addition, the SIM card 60, for example, generates a session key on the basis of the secret key that is maintained to be common to the IC card 1 and establishes secure communication of performing encrypted communication using the session key with the IC card 1.

Next, the IC card 1 acquires fingerprint information (Step S112). The command processor 251 of the IC card 1 causes the biometric verification processor 81 to generate biometric authentication information based on the fingerprint information of the user acquired from the fingerprint sensor 7 in accordance with a command for registering the biometric authentication information based on the registration application of the SIM card 60. The biometric verification processor 81 generates biometric authentication information based on the fingerprint information of the user acquired from the fingerprint sensor 7, and the command processor 251 acquires biometric authentication information generated by the biometric verification processor 81.

Next, the IC card 1 registers the biometric authentication information (Step S113) The command processor 251 stores the biometric authentication information acquired from the biometric verification processor 81 in the AP data storage 281.

Next, the IC card 1 notifies the terminal device 5 of completion of the registration (Step S114). The command processor 251 of the IC card 1 notifies the terminal device 5 of completion of the registration as a response to the command process of registering the biometric authentication information.

Next, the terminal device 5 notifies the IC card management server 3 of completion of the registration. The terminal controller 54 of the terminal device 5 transmits a notification of completion of the notification to the IC card management server 3 through the NW communicator 51. In a case in which the notification of completion of the registration has been received, the registration processor 331 of the IC card management server 3 changes the "registration/non-registration of biometric authentication information" corresponding to the IC card 1, which is stored by the user information storage 321, to "registered" (see FIG. 2).

As described above, the IC card system 100 according to this embodiment includes the IC card management server 3 and the IC card 1. The IC card management server 3 stores a card ID (card identification information), user information relating to a contract of the SIM card 60, and a secret key in association with each other. The IC card management server 3 requests the MNO server 4 (the SIM management server) to make an inquiry regarding a user based on the user information and, in a case in which validity of the user is verified, transmits a generation request for generating a registration application for registering biometric authentication information based on biometric information of the user, which includes card identification information and a secret key, to the MNO server 4. In addition, the IC card 1 includes the AP data storage 281 (the data storage) that stores card identification information and a secret key and can store biometric authentication information of the user. The IC card 1 performs communication with the SIM card 60 on the basis of the registration application generated by the MNO server 4. In a case in which authentication based on the card identification information and the secret key is successful in accordance with the communication with the SIM card 60, the IC card 1 stores the biometric authentication information based on the biometric information acquired from the user in the AP data storage 281.

In this way, the IC card system 100 according to this embodiment performs identity verification of the user using the user information relating to the contract of the SIM card 60, and accordingly, for example, biometric authentication information of the user can be registered in the IC card 1 without the user visiting a counter of a bank (without performing face-to-face identity verification). Accordingly, the IC card system 100 according to this embodiment can improve convenience.

In addition, in the IC card system 100 according to this embodiment, biometric information and biometric authentication information are not transmitted on the network NW1. For this reason, the IC card system 100 according to this embodiment can register the biometric authentication information of the user in the IC card 1 while securing the security.

In addition, the IC card system 100 according to this embodiment further includes the terminal device 5 in which the SIM card 60 is integrated and the MNO server 4. The MNO server 4 executes an inquiry regarding a user in accordance with a request for making an inquiry regarding the user from the IC card management server 3 (verification request) and transmits a result of the inquiry to the IC card management server 3. The MNO server 4 generates a registration application corresponding to a card ID and a secret key in accordance with the generation request and notifies the terminal device 5 of a download notification representing that the registration application can be downloaded. The terminal device 5 acquires the registration application on the basis of the download notification.

In this way, in the IC card system 100 according to this embodiment, the terminal device 5 that has received the download notification can appropriately acquire a registration application corresponding to a card ID and a secret key, and biometric authentication information of the user can be registered in the IC card 1. For this reason, the IC card system 100 according to this embodiment can register biometric authentication information of the user in the IC card 1 while further securing the security.

In addition, in this embodiment, the IC card 1 includes the fingerprint sensor 7 (a biometric information acquiring unit) that acquires biometric information. The IC card 1 stores the biometric authentication information based on the biometric information acquired from the user using the fingerprint sensor 7 in the AP data storage 281.

In this way, in the IC card system 100 according to this embodiment, the biometric information of the user is acquired inside the IC card 1, and biometric authentication information of the user is generated inside the IC card 1, whereby a possibility of the biometric information and the biometric authentication information of a user outflowing to the outside can be reduced. Accordingly, the IC card system 100 according to this embodiment can register biometric authentication information of a user in the IC card 1 while further securing the security.

In this embodiment, biometric information is fingerprint information of a user. The fingerprint information, for example, can be acquired using the fingerprint sensor 7 in a relatively simplified manner, and biometric authentication can be performed using biometric authentication information of which a volume is smaller than that of different biometric information. For this reason, the IC card system 100 according to this embodiment can relatively easily realize biometric authentication using the fingerprint information inside the IC card 1 and can improve the convenience.

An information registering method according to this embodiment includes an inquiry step, a generation request step, and a process step. In the inquiry step, the IC card management server 3 that stores a card ID, user information relating to a contract of the SIM card 60, and a secret key in association with each other requests the MNO server 4 to make an inquiry regarding a user based on the user information. In the generation request step, in a case in which validity of the user is verified in the inquiry step, the IC card management server 3 transmits a generation request for generating a registration application registering biometric authentication information based on biometric information of the user, which includes a card ID and a secret key, to the MNO server 4. In the process step, the IC card 1 including the AP data storage 281 that stores card identification information and a secret key and can store biometric authentication information of the user communicates with the SIM card 60 on the basis of the registration application generated in the generation request step. Then, in a case in which authentication based on the card identification information and the secret key is successful in accordance with the communication with the SIM card 60, the IC card 1 stores the biometric authentication information based on the biometric information acquired from the user in the AP data storage 281.

In this way, the information registering method according to this embodiment has effects similar to those of the IC card system 100 described above and can improve the convenience.

Second Embodiment

Next, an IC card system 100a according to a second embodiment will be described with reference to the drawing.

Figure 7:
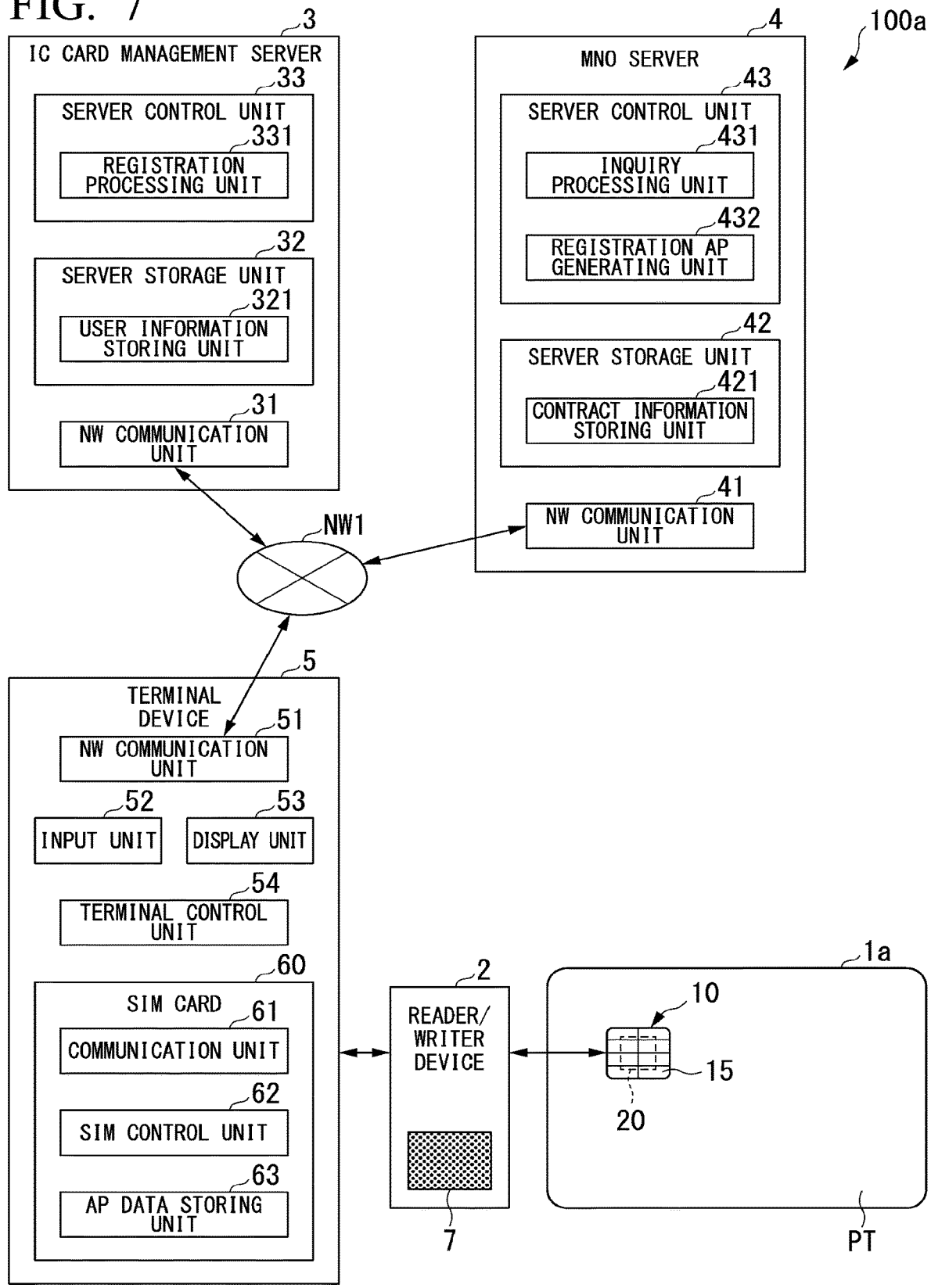
FIG. 7 is a block diagram illustrating one example of an IC card system according to a second embodiment.

FIG. 7 is a block diagram illustrating one example of an IC card system 100a according to this embodiment. As illustrated in FIG. 7, the IC card system 100a includes an IC card 1a, a reader/writer device 2, an IC card management server 3, an MNO server 4, and a terminal device 5.

In this diagram, the same reference signal will be assigned to the same component as that illustrated in FIG. 1, and description thereof will not be presented.

In this embodiment, a case in which the IC card 1a does not include the fingerprint sensor 7, and the reader/writer device 2 includes the fingerprint sensor 7 will be described.

The reader/writer device 2 is connected between the IC card 1a and the terminal device 5 and performs a communication process between the SIM card 60 and the IC card 1. In addition, the reader/writer device 2 includes the fingerprint sensor 7.

The IC card 1a is similar to the IC card 1 according to the first embodiment described above except for not including the fingerprint sensor 7 and the verification processor 8. Since the hardware configuration of the IC card 1a is similar to that of the IC card 1 illustrated in FIG. 1 except for not including the fingerprint sensor 7 and the verification processor 8, description thereof will not be presented here.

Figure 8:
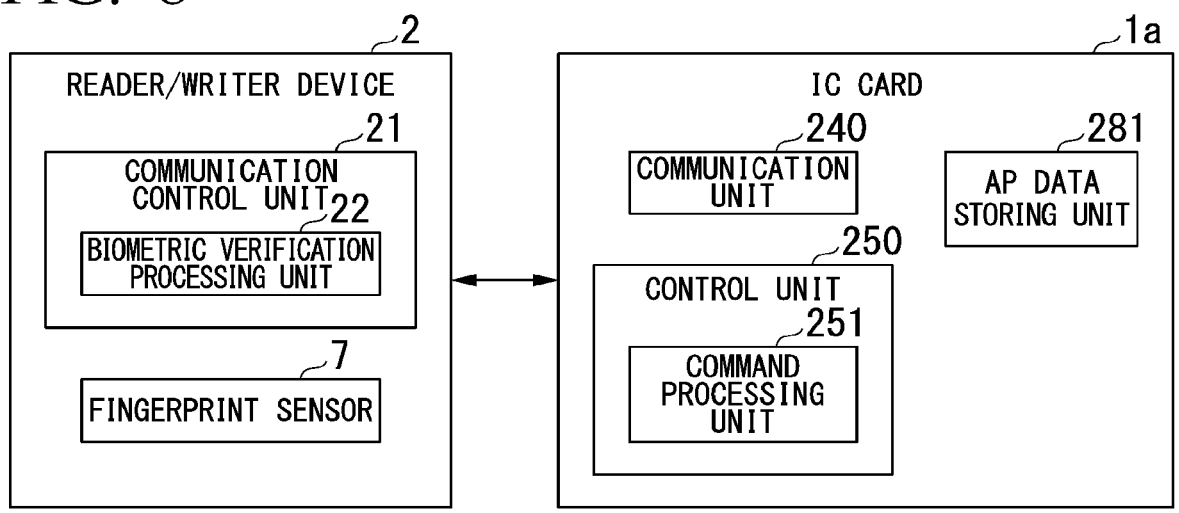
FIG. 8 is a block diagram illustrating an example of the functional configuration of a reader/writer device and an IC card according to the second embodiment.

FIG. 8 is a block diagram illustrating an example of the functional configuration of the reader/writer device 2 and the IC card 1a according to this embodiment. In this drawing, the same reference numeral will be assigned to the same component as that illustrated in FIG. 5, and description thereof will not be presented.

As illustrated in FIG. 8, the reader/writer device 2 includes a communication controller 21 including a biometric verification processor 22 and a fingerprint sensor 7. In other words, the reader/writer device 2 includes the fingerprint sensor 7 and the biometric verification processor 22 instead of the IC card 1a.

The communication controller 21, for example, is realized by a CPU and a program memory not illustrated in the drawing and controls communication between the IC card 1a and a terminal device 5 (a SIM card 60).

The biometric verification processor 22 generates biometric authentication information on the basis of user's fingerprint information acquired from the fingerprint sensor 7 and outputs the generated biometric authentication information to the IC card 1a through the communication controller 21.

The IC card 1a stores biometric authentication information based on the biometric information acquired from the user using the fingerprint sensor 7 included in the reader/writer device 2 in an AP data storage 281.

Next, operations of the IC card system 100a according to this embodiment will be described with reference to the drawing.

Figure 9:
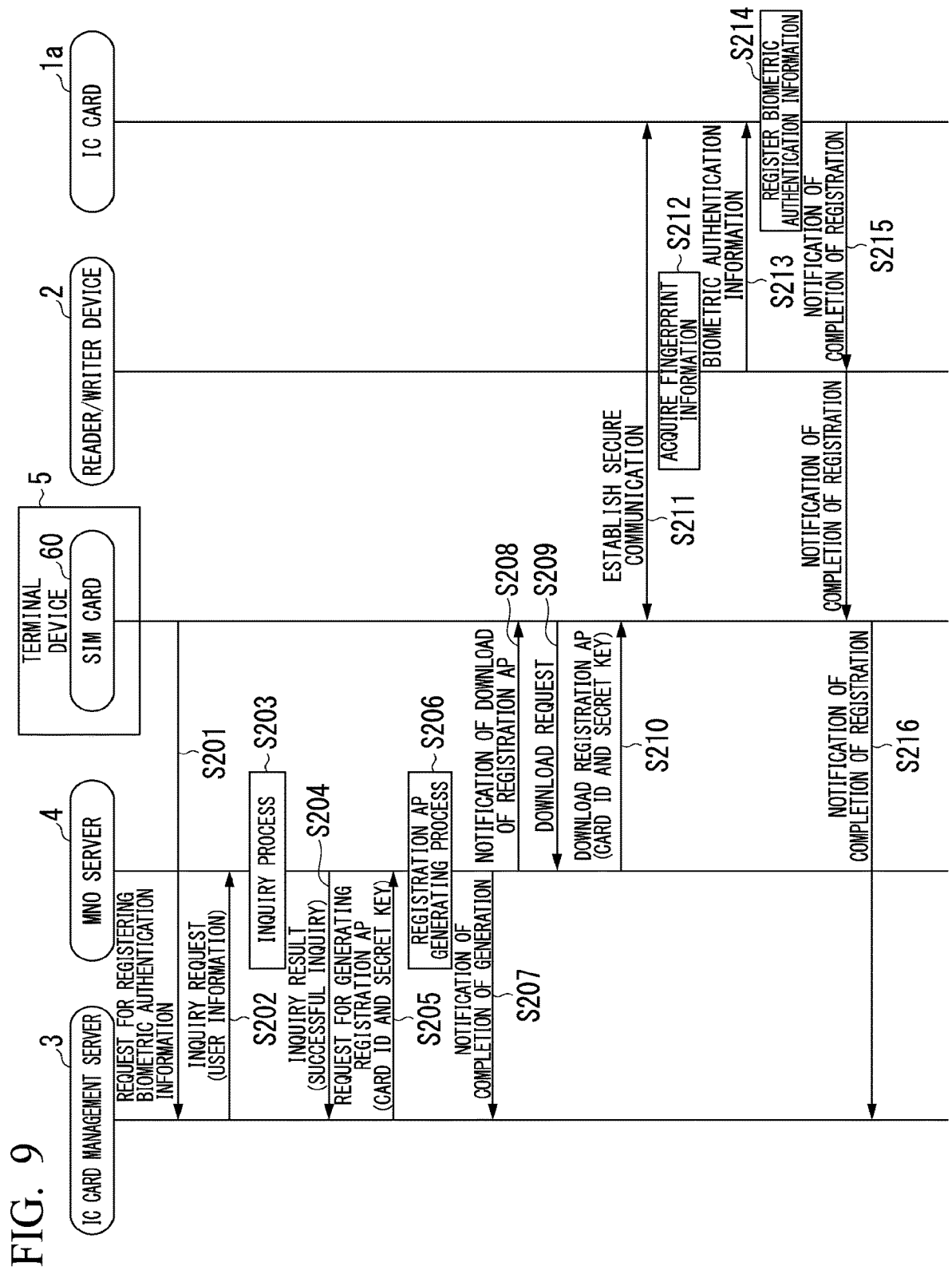
FIG. 9 is a diagram illustrating one example of an operation of an IC card system according to the second embodiment.

FIG. 9 is a diagram illustrating one example of operations of the IC card system 100a according to this embodiment. FIG. 9 illustrates a process of registering biometric authentication information of the IC card system 100a.

In FIG. 9, processes of Step S201 to Step S210 are similar to the processes of Step S101 to Step S110 illustrated in FIG. 6 described above, and thus, description thereof will not be presented here.

In Step S211, the SIM card 60 of the terminal device 5 establishes secure communication with the IC card 1a through the reader/writer device 2. The SIM card 60 starts communication with the IC card 1a through the terminal device 5 and the reader/writer device 2 on the basis of the registration application and executes an authentication process with the IC card 1a using the card ID and the secret key stored in the AP data storage 63. In addition, the SIM card 60, for example, generates a session key on the basis of the secret key that is maintained to be common to the IC card 1a and establishes secure communication of performing encrypted communication using the session key with the IC card 1a.

Next, the reader/writer device 2 acquires fingerprint information (Step S212). The communication controller 21 of the reader/writer device 2 causes the biometric verification processor 22 to generate biometric authentication information based on the fingerprint information of the user acquired from the fingerprint sensor 7 in accordance with a command for registering the biometric authentication information based on the registration application of the SIM card 60. The biometric verification processor 22 generates biometric authentication information based on the fingerprint information of the user acquired from the fingerprint sensor 7.

Next, the reader/writer device 2 transmits the biometric authentication information to the IC card 1a (Step S213). The communication controller 21 transmits a command for registering biometric authentication information including the biometric authentication information generated by the biometric verification processor 22 to the IC card 1a.

Next, the IC card 1a registers the biometric authentication information (Step S214). The command processor 251 of the IC card 1a stores the biometric authentication information acquired from the reader/writer device 2 in accordance with a command for registering biometric authentication information in the AP data storage 281.

The following processes of Step S215 and Step S216 are similar to the processes of Step S113 and Step S115 illustrated in FIG. 6 described above, and thus description thereof will not be presented here.

As described above, the IC card system 100a according to this embodiment includes the IC card 1a, the reader/writer device 2, the IC card management server 3, the MNO server 4, and the terminal device 5. The reader/writer device 2 includes the fingerprint sensor 7 (a biometric information acquiring unit) acquiring biometric information and performs a communication process between the SIM card 60 and the IC card 1a. The IC card 1a stores biometric authentication information based on the biometric information acquired from the user using the fingerprint sensor 7 included in the reader/writer device 2 in the AP data storage 281.

In this way, the IC card system 100a according to this embodiment has effects similar to those according to the first embodiment described above and can improve the convenience.

In each of the embodiments described above, although an example in which fingerprint information is acquired as one example of biometric information, and biometric authentication information based on the fingerprint information is registered in the IC card 1 (1a) has been described, the embodiments are not limited thereto. For example, the biometric information may be vein pattern information, iris information, voiceprint information, DNA information, or the like and may be any other biometric information as long as the information enables biometric authentication.

In addition, in each of the embodiments described above, although an example in which the IC card 1(1a) communicates with the outside through the contact part 15 has been described, the IC card may be configured to communicate with the outside through a contactless interface using a coil or the like. In such a case, power may be supplied to the IC card 1 (1a) through the coil or the like.

In addition, in each of the embodiments described above, although the IC card 1 (1a) has a configuration in which the EEPROM 28 is included as a rewritable nonvolatile memory, the embodiments are not limited thereto. For example, the IC card 1 (1a) may include a flash memory, a ferroelectric random access memory (FeRAM), or the like instead of the EEPROM 28.

In addition, in each of the embodiments described above, although an example in which a download notification is performed using an SMS has been described, the embodiments are not limited thereto and, for example, a notification may be performed using an electronic mail, a social networking service (SNS), or the like.

Furthermore, in each of the embodiments described above, although an example in which the IC card management server 3 and the MNO server 4 are different server apparatuses has been described, for example, in a case in which a management company of the IC card 1 (1a) and a mobile communication service provider managing the SIM card 60 are the same or the like, the MNO server 4 may include the function of the IC card management server 3.

In addition, in each of the embodiments described above, although an example in which the registration application is downloaded (installed) to the SIM card 60 has been described, the registration application may be downloaded and installed to the terminal device 5 and the SIM card 60 in a divisional manner. In such a case, the card ID and the secret key are stored by the SIM card 60.

In addition, after the biometric authentication information is registered in the IC card 1 (1a), the registration application may be prohibited from use or deleted. In addition, the registration application may have a use limit such as the number of times of use (for example, usable once) or a use term (for example, within 24 hours from download or the like).

Furthermore, in each of the embodiments described above, although an example in which a user name and a telephone number are used as one example of user information transmitted to the MNO server 4 at the time of making an inquiry regarding a user has been described, the embodiments are not limited thereto, and, for example, information such as an address, date of birth, an age and the like of a user may be used.

In addition, in the first embodiment described above, although an example in which the verification processor 8 is disposed outside the IC module 10 has been described, the embodiment is not limited thereto, and the IC module 10 may have functions corresponding to the verification processor 8.

In addition, in the second embodiment, the terminal device 5 may have the reader/writer device 2 integrated thereinto. Furthermore, the reader/writer device 2 may include a secure module for performing secure communication between the IC card 1a and the SIM card 6.

According to at least one of the embodiments described above, by including the IC card management server 3 that requests the MNO server 4 to make an inquiry regarding a user based on user information relating to a contract of the SIM card 60 and, in a case in which the validity of a user is verified, transmits a generation request for generating a registration application registering biometric authentication information of the user, which includes a card ID and a secret key, to the MNO server 4 and the IC card that communicates with the SIM card 60 on the basis of the registration application generated by the MNO server 4 and, in a case in which authentication based on the card ID and the secret key through communication with the SIM card 60 is successful, stores the biometric authentication information of the user in the AP data storage 281, the convenience can be improved.

The embodiment described above can be represented as below.

An IC card system including an IC card management server and an IC card, wherein the IC card management server includes a user information storage that stores card identification information, user information relating to a contract of an SIM card, and a secret key in association with each other, a first storage unit that stores at least information relating to a first program that can be executed by a computer, and a first hardware processor that executes the first program stored in the first storage unit, the first hardware processor, by executing the first program, requests the SIM management server to make an inquiry regarding a user based on the user information and, in a case in which validity of the user is verified, transmits a generation request for generating a registration application registering biometric authentication information based on biometric information of the user, which includes the card identification information and the secret key, to the SIM management server, the IC card includes a data storage that stores the card identification information and the secret key and is capable of storing the biometric authentication information of the user, a second storage unit that stores at least information relating to a second program that can be executed by the computer, and a second hardware processor that executes the second program stored in the second storage unit, the second hardware processor, by executing the second program, communicates with the SIM card on the basis of the registration application generated by the SIM management server and, in a case in which authentication based on the card identification information and the secret key through communication with the SIM card is successful, stores the biometric authentication information based on the biometric information acquired from the user in the data storage.

In addition, by recording a program for realizing the function of each component included in the IC card system 100(100a) according to the embodiment in a computer-readable recording medium and causing a computer system to read and execute the program recorded in this recording medium, the process of each component included in the IC card system 100 (100a) described above may be performed. Here, "causing a computer system to read and execute the program recorded in the recording medium" includes installing the program in the computer system. The "computer system" described here includes an operating system (OS) and hardware such as peripherals.

In addition, the "computer-readable recording medium" represents a portable medium such as a flexible disk, a magneto-optical disk, a ROM, or a CD-ROM or a storage device such as a hard disk integrated into the computer system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An information registering method comprising:
    requesting, by an IC card management server that stores card identification information, a SIM management server to make an inquiry regarding a user based on user information, the user information relating to a contract of a SIM card, and a secret key in association with each other;
    making the inquiry, by the SIM management server, by comparing a user name and a telephone number with the user information relating to the contract of the SIM card stored in the SIM management server;
    determining, by the SIM management server, a validity of the user based on the result of the comparison;
    transmitting, by the SIM management server, a result of determination of the validity of the user to the IC card management server;
    transmitting, by the IC card management server a generation request for generating a registration application for registering a biometric authentication information based on biometric information of the user, together with the card identification information and the secret key, to the SIM management server in a case that validity of the user is verified by the SIM management server;
    generating, by the SIM management server, a registration application using the card identification information and the secret key;
    notifying, by the SIM management server, a terminal device of a notification of download of the registration application;
    downloading, by the SIM management server, the registration application to the SIM card of the terminal device, upon receipt of a request for downloading the registration application, wherein the registration application allows the SIM card to communicate via the terminal device with an IC card storing the card identification information and the secret key and the biometric authentication information, and wherein the registration application allows the SIM card in the terminal to authentication process using the card identification information and the secret key, and the registration application allows the SIM card to generate a session key on the basis of the secret key;
    executing an authentication process by the SIM card with the IC card using the card identification information and the secret key;
    communicating, by an IC card that includes a data storage storing the card identification information and the secret key and the biometric authentication information of the user, with the SIM card on the basis of the registration application; and storing, into the data storage of the IC card, the biometric authentication information based on the biometric information acquired from the user in a case that the authentication succeeds based on the card identification information and the secret key through the communication with the SIM card.

2. An IC card system comprising:

a SIM management server that manages SIM cards;

an IC card management server that stores card identification information, user information relating to a contract of a SIM card, and a secret key;

an IC card that includes a data storage storing the card identification information, the secret key, and biometric authentication information of the user, wherein the IC card management server requests the SIM management server to make an inquiry regarding a user, the SIM management server makes the inquiry by comparing a user name and a telephone number with the user information relating to the contract of the SIM card stored in the SIM management server, the SIM management server determines validity of the user based on the result of the comparison, the SIM management server transmits a result of determination of the validity of the user to the IC card management server, the IC card management server transmits, in a case that validity of the user is verified by the SIM management server, a generation request for generating a respective registration application for registering a respective biometric authentication information based on a respective biometric information of the user, together with the card identification information and the secret key, to the SIM management server, the SIM management server generates a registration application using the card identification information and the secret key, the SIM management server notifies a terminal device of a notification of download of the registration application, the SIM management server downloads the registration application to the SIM card of the terminal device, upon receipt of a request for downloading the registration application, wherein the registration application allows the SIM card to communicate via the terminal device with an IC card storing the card identification information and the secret key and the biometric authentication information, and wherein the registration application allows the SIM card in the terminal to authentication process using the card identification information and the secret key, and the registration application allows the SIM card to generate a session key on the basis of the secret key, the SIM card executes an authentication process with the IC card using the card identification information and the secret key, and the IC card communicates with the SIM card on the basis of the registration application generated by the SIM management server, and, the IC card stores in the data storage, the biometric authentication information based on the biometric information in a case that the authentication succeeds based on the card identification information and the secret key through communication with the SIM card.

3. The IC card system according to claim 2, comprising:

a terminal device that has the SIM card integrated therein, wherein the SIM management server that executes an inquiry regarding the user in response to a request for making an inquiry regarding the user from the IC card management server, transmits a result of the inquiry to the IC card management server, generates the registration application corresponding to the card identification information and the secret key in response to the generation request, and notifies the terminal device of a download notification representing that the registration application is downloadable, and the terminal device acquires the registration application on the basis of the download notification.

4. The IC card system according to claim 2, wherein the IC card includes a biometric information acquiring unit that acquires the biometric information and stores the biometric authentication information based on the biometric information acquired from the user using the biometric information acquiring unit in the data storage.

5. The IC card system according to claim 2, further comprising:

a reader/writer device that includes a biometric information acquiring unit for acquiring the biometric information and for performing a communication process between the SIM card and the IC card, wherein the IC card stores the biometric authentication information based on the biometric information acquired from the user using the biometric information acquiring unit included in the reader/writer device in the data storage.

6. The IC card system according to claim 2, wherein the biometric information includes a fingerprint information of the user.

7. The IC card system according to claim 2, wherein the IC card management server and the IC card are implemented to execute the information registering method.

* * * * *